Feb. 15, 1949. W. A. RAY 2,461,772
FLUID CONTROL VALVE
Filed Nov. 20, 1944
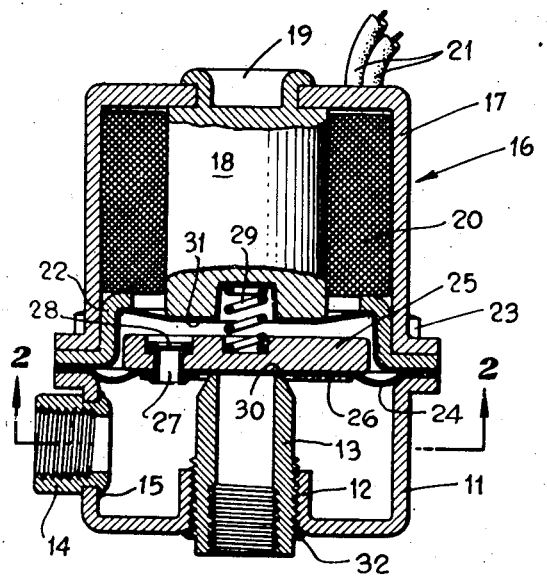
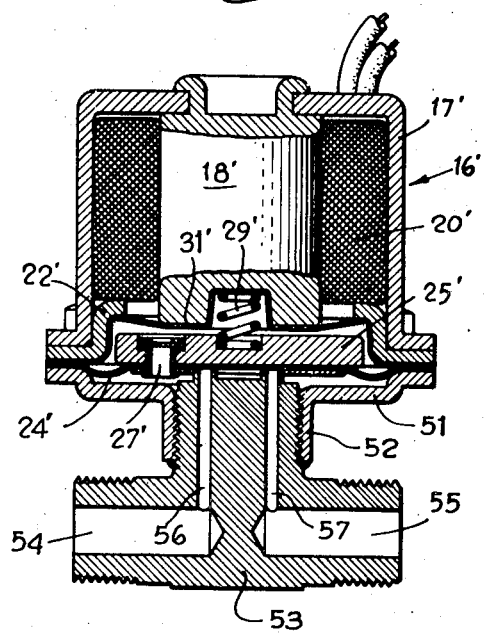
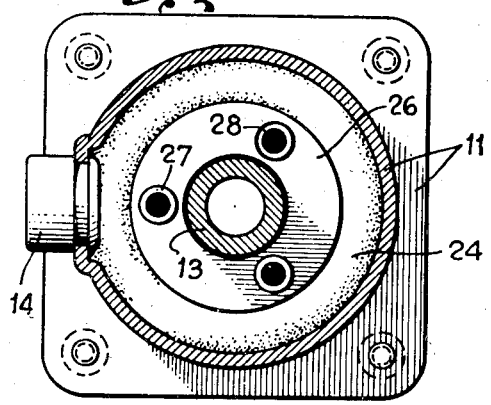
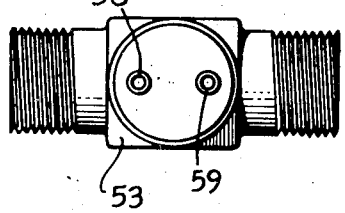
Inventor:
WILLIAM A. RAY,
By John H. Rouse,
Attorney.

Patented Feb. 15, 1949

2,461,772

UNITED STATES PATENT OFFICE 2,461,772

FLUID CONTROL VALVE

William A. Ray, Los Angeles, Calif., assignor to General Controls Co., a corporation Application November 20, 1944, Serial No. 564,188

3 Claims. (Cl. 137—139)

My present invention relates to fluid control valves, and more particularly to those of the electrically-operated type wherein a disk-shaped armature is arranged for attraction by an electromagnet, the armature also serving as a closure movable into and out of engagement with the seat or seats of the valve.

An object of this invention is to provide a valve, of the character described, which is simple and economical to manufacture and wherein the body portions of the valve and electromagnet are of such character that they can be produced from sheet metal as punch-press stampings.

Another object is to provide a valve having a fitting for connecting the valve to a fluid supply conduit, which fitting is so constructed and arranged that a portion thereof at the interior of the valve serves as a valve-port seat for the closure.

Another object is to provide a valve wherein the fitting, referred to in the preceding object, can be adjusted after assembly of the valve to vary the lift of the closure.

Another object is to provide a valve wherein the exterior portion of the fitting is of T-shape and includes, within the valve, a pair of ports which communicate individually with the inlet and the outlet of the fitting.

Other objects and advantages of the invention will be found in the description, the drawing, and the claims; and, for full understanding of the invention, reference is to be had to the following detailed description and accompanying drawings, wherein:

Figure 1 is a vertical sectional view of a valve embodying the invention;

Figure 2 is a transverse section taken along the line 2—2 of Fig. 1;

Figure 3 is a view, similar to that of Fig. 1, showing a modified form of valve according to the invention; and Figure 4 is a plan of the T-shaped fitting shown at the lower end of the valve of Fig. 3.

Referring first to Figs. 1 and 2 of the drawing, the numeral 11 indicates a cup-shaped casing, formed of sheet metal, having in its bottom wall an inwardly-turned annular portion or flange 12 which is threaded to receive a tubular member or fitting 13, the fitting being internally threaded at its outer end for connection to a fluid supply conduit. Within an opening in the side wall of casing 11 is another fitting 14, internally threaded for connection to a conduit, which is riveted over at its end within the casing and sealingly secured by solder 15.

Mounted on top of the valve casing is an electromagnet, generally indicated at 16, which comprises an outer core 17 of inverted cup-shaped form (conveniently formed from sheet metal), to the central portion of the end wall of which is secured a cylindrical core 18; this core having a short tubular extension 19 received in an opening through the wall and riveted-over thereupon. Within the cup-shaped core 17, and around core 18, is an energizing coil winding 20 having connecting leads 21 which extend through an insulated opening in the top wall of core 17. Within the lower portion of core 17 is an annular dished member 22, of magnetic material, which serves to retain the coil in position and also as means for effectively conducting the magnetic flux to a point adjacent the inner core 18. This feature is disclosed in my copending application Serial No. 552,647, filed September 4, 1944. The core 18, member 22, and casing 11 are secured together at their flanges by screws 23.

Clamped at its margin between the flanges of the valve casing and member 22 is a flexible diaphragm 24, conveniently of leather or synthetic rubber, which is attached to the underside of a disk-shaped armature 25 by a centrally-apertured disk 26; the disk being fastened to the armature by a plurality of eyelets 27 riveted-over in recessed openings in the armature and each being provided at its upper end with a strainer 28, of fine-mesh gauze, which serves to prevent passage of foreign matter to the electromagnet. Received at its ends in aligned shallow recesses in the adjacent central portions of core 18 and armature 25 is a compression spring 29 which urges the armature downwardly into engagement with a narrow annular seat 30 formed by the tapered upper end of the fitting 13.

Lining the inner surface of the member 22, the bottom of core 18, and the spring recess therein, is a generally cup-shaped element 31 of thin non-magnetic material, such as copper, which serves both as means for shielding the interior of the electromagnet from the fluid controlled by the valve, and also to prevent direct engagement of armature 25 with the underside or pole-face of core 18 when, upon energization of the electromagnet, the armature-closure 25 is attracted out of engagement with its seat 30.

After the valve is assembled, its desired flow capacity can be adjusted by screwing fitting 13 upwardly or downwardly and then locking it in position, as by the solder indicated at 32.

In the modified form of valve shown in Fig. 3, the upper portion, including the electromagnet and the armature, is substantially identical in construction with that shown in Figs. 1 and 2 and the same numerals as in those figures (but with a prime mark added) have therefore been assigned to the corresponding parts in Fig. 3.

Secured below the electromagnet assembly is a shallow sheet-metal casing 51 which is formed at its center to provide an outwardly-turned annular flange 52 which is internally threaded to receive a T-shaped fitting 53, shown per se in plan in Fig. 4. The ends of the horizontal portion of this fitting are threaded for connection in a conduit system and are provided with bores 54 and 55, from the respective inner ends of which there extend vertical passages or ports 56 and 57. The top surface of member 53 is so machined that the material around the upper ends of ports 56, 57 forms a pair of raised narrow seats 58 and 59, respectively, (Fig. 4) cooperable with the armature-closure 25'. By the provision of separate inlet and outlet ports (instead of a single port as in Fig. 1) the possibility of leakage due to the deposit upon the seats 58, 59 of foreign matter carried by the fluid controlled by the valve is reduced. This feature is covered in my copending application Serial No. 563,690, filed November 16, 1944.

The embodiments of my invention herein shown and described are obviously susceptible of modification without departing from the spirit of the invention, and I intend therefore to be limited only by the scope of the appended claims.

I claim as my invention:

1. In a fluid control valve: a cup-shaped casing; a member having a cylindrical portion mounted so as to extend through an opening in the end wall of said casing in a direction generally at right-angles thereto, and at its outer end a pair of laterally-extending portions forming an inlet and an outlet connection for the valve, said member having a pair of passages extending longitudinally of said cylindrical portion to the inner end thereof and communicating individually with said connections; a closure cooperably with said inner end of the member to control fluid flow through said passages; and motor means sealingly covering the open end of said casing for moving said closure in opposite directions generally along the axis of said cylindrical portion of the member; said passages serving as the sole means for conveying fluid through the valve.

2. In a fluid control valve: a valve body; a member having within said body a cylindrical portion mounted in an opening through a wall of the body, said member having at the exterior of the body means forming in inlet and an outlet connection for the valve, said member having a pair of passages extending longitudinally of said cylindrical portion to the inner end thereof and communicating individually with said connections, said passages serving as the sole means for conveying fluid through the valve body, the material of said member being raised around each of said passages at their inner ends to form a pair of narrow annular valve seats disposed in a plane at right-angles to the axis of said cylindrical portion; a closure having a plane surface cooperable with said seats; and motor means mounted on said body for moving said closure in opposite directions along the axis of the cylindrical portion to simultaneously cover or uncover both of said seats.

3. In a fluid control valve: a cup-shaped casing; a member having within said casing a cylindrical portion mounted in an opening through the end wall of the casing and extending in a direction generally at right-angles thereto, said member having at the exterior of the casing a pair of laterally-extending portions forming an inlet and an outlet connection for the valve, said member having a pair of passages extending longitudinally of said cylindrical portion to the inner end thereof and communicating individually with said connections, said passages serving as the sole means for conveying fluid through the casing, the material of said member being raised around each of said passages at their inner ends to form a pair of narrow annular valve seats disposed in a plane at right-angles to the axis of the cylindrical portion; a disk-like closure of magnetic material having a plane surface cooperable with said seats; and an electromagnet for moving said closure in opposite directions along the axis of the cylindrical portion to simultaneously cover or uncover both of said seats, said electromagnet comprising an inverted cup-shaped core sealingly covering the open end of the casing.

WILLIAM A. RAY.

REFERENCES CITED

The following references are of record in the file of this patent:

UNITED STATES PATENTS

| Number | Name | Date |
|---|---|---|
| 602,737 | Farrell | Apr. 19, 1898 |
| 854,300 | Moore | May 21, 1907 |
| 1,045,399 | Hague | Nov. 26, 1912 |
| 1,699,541 | Murray | Jan. 22, 1929 |
| 1,738,437 | Langdon | Dec. 3, 1929 |
| 1,841,140 | Murphy | Jan. 12, 1932 |
| 2,303,066 | Ray | Nov. 24, 1942 |
| 2,335,312 | Rotheim | Nov. 30, 1943 |

FOREIGN PATENTS

| Number | Country | Date |
|---|---|---|
| 17,926 | Great Britain | 1913 |
| 53,210 | Sweden | 1918 |
| 100,142 | Sweden | 1940 |